(12) United States Patent
Derderian et al.

(10) Patent No.: US 9,689,707 B1
(45) Date of Patent: Jun. 27, 2017

(54) SYSTEM, METHOD, AND INDICATOR FOR DISTRIBUTING, GENERATING, AND PRESENTING RELATIVE LOCATIONS OF POINTS OF INTEREST

(71) Applicants: Ara J. Derderian, Trabuco Canyon, CA (US); Marc B. LeBlanc, Ladera Ranch, CA (US); Michael T. Diekmann, Yorba Linda, CA (US)

(72) Inventors: Ara J. Derderian, Trabuco Canyon, CA (US); Marc B. LeBlanc, Ladera Ranch, CA (US); Michael T. Diekmann, Yorba Linda, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 24 days.

(21) Appl. No.: 14/865,597

(22) Filed: Sep. 25, 2015

(51) Int. Cl.
*G01C 23/00* (2006.01)
*B64D 45/00* (2006.01)

(52) U.S. Cl.
CPC .......... *G01C 23/005* (2013.01); *B64D 45/00* (2013.01)

(58) Field of Classification Search
CPC ............................. G01C 23/005; B64D 45/00

USPC ......................................................... 701/530
See application file for complete search history.

(56) References Cited

U.S. PATENT DOCUMENTS

| 8,880,243 B1 | 11/2014 | Duvall et al. |
| 8,995,440 B1 | 3/2015 | LeBlanc et al. |

*Primary Examiner* — Brian P Sweeney
(74) *Attorney, Agent, or Firm* — Daniel M. Barbieri; Donna P. Suchy; Angel N. Gerdzhikov

(57) ABSTRACT

A system, method, and indicator for distributing, generating, and presenting relative locations of points of interest to a viewer are disclosed. A distribution system may include a discovery datagram generator and a flight navigation datagram generator for broadcasting a discovery datagram and flight navigation datagram, respectively, to a portable electronic device (PED), where the flight navigation datagram may be comprised of navigation data representative of flight navigation information. A generating method may be performed by the PED configured to listen for and receive the discovery datagram; listen for and receive the navigation datagram continuously; and generate a display data set representative of the indicator continuously, where the indicator includes a directional pointer, a first rounded indicator, a second rounded indicator, and one or more location indicators, where each location indicator indicates a relative bearing to a point of interest measured with reference to the directional pointer.

20 Claims, 7 Drawing Sheets

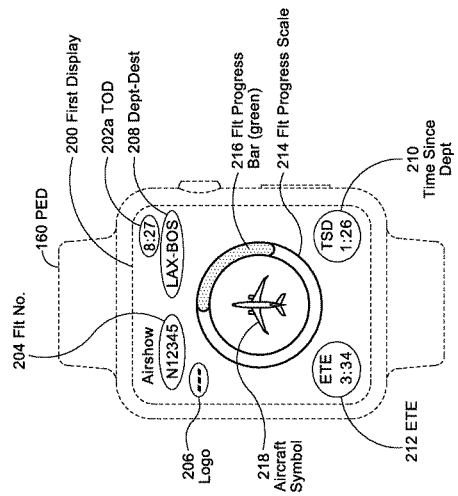
FIG. 2
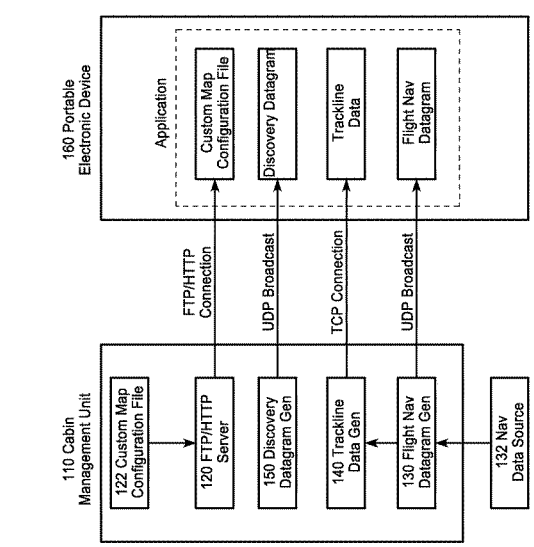
FIG. 1A
FIG. 1B

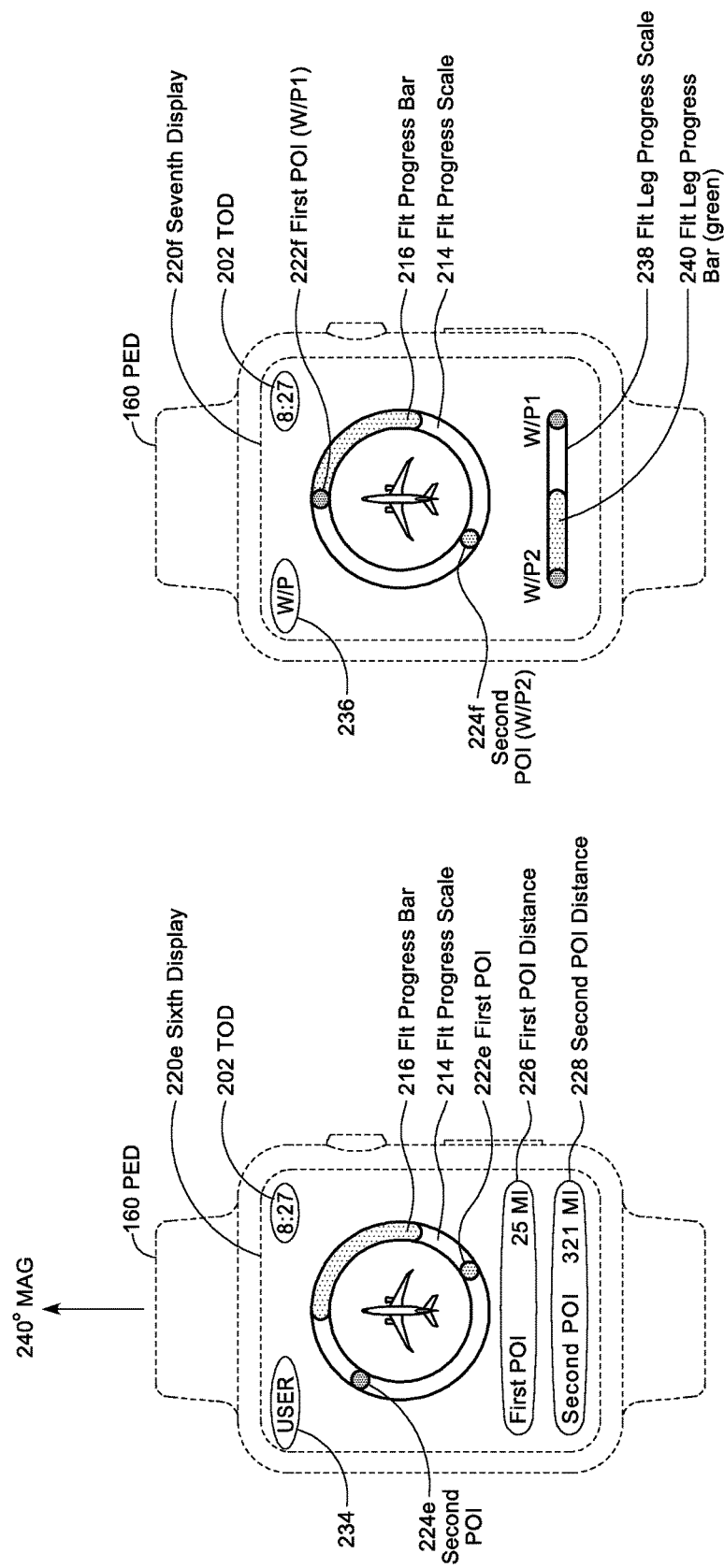

SYSTEM, METHOD, AND INDICATOR FOR DISTRIBUTING, GENERATING, AND PRESENTING RELATIVE LOCATIONS OF POINTS OF INTEREST

BACKGROUND

In-flight information distribution systems may present an occupant or passenger of an aircraft with a variety of in-flight information related to the flight of an aircraft in which he or she occupies. An example of an in-flight distribution system is the Rockwell Collins' Airshow® 4000 system configurable to provide moving map displays, where each such display may present a colorful and graphical flight path of the aircraft (both the projected flight path and the already-flown ground track) against the background of colorful two-dimensional or three-dimensional moving map, wherein the surface of the Earth is shown as a flat, two-dimensional surface or as a spherical, three-dimensional surface. One example of an in-flight distribution system was disclosed by LaBlanc et. al. in U.S. Pat. No. 8,995,440 entitled "In-Flight Information Distribution System, Device, and Method for a Portable Electronic Device," a publication which is hereby incorporated by reference in its entirety.

Although in-flight information distribution systems are useful and have enjoyed a long history of use, the presentation of information has been limited to display units installed on the aircraft. Examples of such display units include those attached to a cabin bulkhead, installed in the seat back of the seat located in front of the viewer, and attached to a seat armrest folding assembly. Prior to the inventive concepts disclosed by in the LeBlanc publication, distribution of in-flight information did not include the distribution of information to a portable electronic device (PED) that could be carried on-board by a passenger. For the PED that is wearable, the amount of "display real estate" is limited.

SUMMARY

Embodiments of the inventive concepts disclosed herein are directed to a system, method, and indicator for distributing, generating, and presenting information corresponding to relative locations of points of interest including, for instance, those located outside of an aircraft in flight. The indicator could provide a viewer with relative location information measured as an angular bearing referenced to a directional pointer when the amount of "display real estate" is limited.

In one aspect, embodiments of the inventive concepts disclosed herein are directed to a system for distributing relative locations of points of interest. The system may include a discovery datagram generator and a flight navigation datagram generator for broadcasting a discovery datagram and flight navigation datagram, respectively, to a portable electronic device (PED).

In a further aspect, embodiments of the inventive concepts disclosed herein are directed to a method performed by the PED configured to listen for and receive the discovery datagram; listen for and receive the navigation datagram continuously; and generate a display data set continuously representative of the indicator as disclosed in the following paragraph.

In a further aspect, embodiments of the inventive concepts disclosed herein are directed to an indicator comprised of a directional pointer, a first rounded indicator, a second rounded indicator, and one or more location symbols. In some embodiments, the first rounded indicator has a fixed length scaled to a first distance. In some embodiments, the second rounded indicator coincides on at least a part of the first rounded indicator and is indicative of a second distance. In some embodiments, a position of each location indicator may be dependent upon an angular bearing measured with reference to the directional pointer.

BRIEF DESCRIPTION OF THE DRAWINGS

FIG. 1A depicts an aircraft configured with a distribution, generation, and presentation system according to the inventive concepts disclosed herein.

FIG. 1B depicts a functional block diagram of the distribution, generation, and presentation system of FIG. 1A.

FIG. 2 depicts a first exemplary display provided by the distribution, generation, and presentation system according to some embodiments of the inventive concepts disclosed herein.

FIG. 3E depicts a sixth exemplary display provided by the distribution, generation, and presentation system according to some embodiments of the inventive concepts disclosed herein.

FIG. 3F depicts a seventh exemplary display provided by the distribution, generation, and presentation system according to some embodiments of the inventive concepts disclosed herein.

DETAILED DESCRIPTION

Figure 3B:
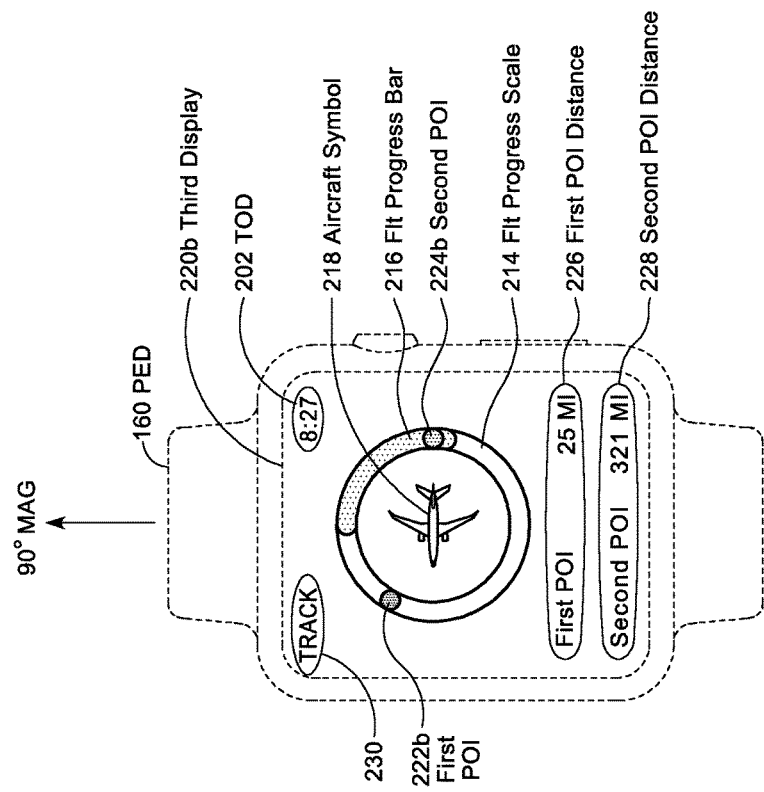
FIG. 3B depicts a third exemplary display provided by the distribution, generation, and presentation system according to some embodiments of the inventive concepts disclosed herein.

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

FIG. 1A depicts an aircraft configured with a distribution, generation, and presentation system 100 suitable for implementation of the techniques described herein. FIG. 1B depicts a functional block diagram of the distribution, generation, and presentation system 100 suitable for implementation of the techniques described herein. The functional blocks of the system 100 include a cabin management unit 110 and a portable electronic device (PED) 160, where the cabin management unit 110 may include a FTP/HTTP server 120, a flight navigation datagram generator 130, a trackline data generator 140, and/or a discovery datagram generator 150.

The FTP/HTTP server 120 could include any computer configured to store, retrieve, and send a custom map configuration file 122 upon a request. The custom map configuration file 122 could be any file configured or tailored to the requests or needs of an owner or operator of an aircraft, where a newer version of the custom map configuration file 122 may replace a current version. When sent to the presentation application running on the PED 160 running an application such as, but not limited to, the "Rockwell Collins Airshow®" application (Airshow app), information content stored in the custom map configuration file 122 such as, but not limited to, customized images, fonts, colors, images, and/or corporation logos that may be displayed on the screen of the PED 160 as specified by the owner or operator of the aircraft. Also, a symbol of an aircraft that is displayed could correspond to the type of aircraft being flown and in which the viewer is an occupant. As embodied herein, the FTP/HTTP server 120 may be configured with a uniform resource location (URL) address and accessible wirelessly to the Airshow app through the use of a network protocol such as a file transfer protocol (FTP) or a hypertext transfer protocol (HTTP). The use of these protocols as well as other protocols such as, but not limited to, the protocols of an internet protocol (IP) suite is known to those skilled in the art.

It should be noted that, in some embodiments for any source or system in an aircraft including the FTP/HTTP server 120, data could be comprised of any analog or digital signal, either discrete or continuous, which could contain information or be indicative of information. In some embodiments, aircraft could mean any vehicle which is able to fly through the air or atmosphere including, but not limited to, lighter than air vehicles and heavier than air vehicles, wherein the latter may include manned or unmanned fixed-wing and rotary-wing vehicles.

The flight navigation datagram generator 130 could include any electronic processor configured to repeatedly (or continuously) generate and broadcast a flight navigation datagram using a user datagram protocol (UDP) via an address (i.e., the flight navigation address) corresponding to an IP address and port number of a UDP broadcast. It should be noted that the term "broadcast" as used herein is synonymous with the term "multicast" and may be used interchangeably. Also, the use of the term "repeatedly" and "continuously" are synonymous. The flight navigation datagram may be comprised of navigation data provided by a navigation data source 132, where such navigation data source 132 could be comprised of any aircraft system configured to provide the distribution system 100 with real-time flight information. The navigation data source 132 may include, but is not limited to, an air/data system, an attitude heading reference system, an inertial guidance system (or inertial reference system), a global navigation satellite system (or satellite navigation system), and a flight management system (FMS), all of which are known to those skilled in the art. The navigation data source 132 could provide flight information including, but not limited to, departure city, current time, estimated departure time, actual departure time, estimated time enroute, estimated time of arrival, active or approved flight plan comprised of a series of waypoints which define a series of flight legs on which the aircraft is expected to fly, ground track information of the track over the ground already flown by the aircraft, geographic position, altitude, current heading, speed, vertical speed, outside air temperature, and mach number.

In some embodiments, the navigation data source 132 could include the external flight information data source disclosed by Duvall et. el. In U.S. Pat. No. 8,880,243 entitled "System, Device, and Method for Presenting Flight Information or One or More Aircraft on a Display Unit," a publication which is hereby incorporated by reference in its entirety. In some embodiments, the navigation data source 132 could include a datalink through which navigation data of other aircraft may be received through a traffic data source for other aircraft could be comprised of one or more systems such as, but not limited to, a traffic collision avoidance system (TCAS), an automatic dependent surveillance—broadcast (ADS-B) system, an aircraft datalink system, an on-board airborne radar system, an on-board optical aircraft sensor system, a traffic information service-broadcast (TIS-B) system, and/or an automatic dependent surveillance-rebroadcast (ADS-R) system. When the flight navigation datagram is broadcast, an application running on the PED 160 may use the flight information in the generation of a display data set as discussed in detail below.

The trackline data generator 140 could include any electronic processor configured to generate and send trackline data using a transmission control protocol (TCP) via an address (i.e., the trackline address) corresponding to an IP address and port number of a TCP connection; the generating and sending of the trackline data may be performed in response to a request made by the Airshow app running on the PED 160. The trackline data may be comprised of navigation data provided by the navigation data source 132 such as the ground track information of the track over the ground already flown by the aircraft. For a viewer of the PED 160 who has launched the Airshow app after the aircraft has departed, the ground track information may be used to plot the track already flown. When the trackline data is broadcast, the Airshow app running on the PED 160 and listening for the trackline data may use the ground track information in the generation of a display data set as discussed in detail below.

The discovery datagram generator 150 could include any electronic processor configured to continuously generate and send a discovery datagram using a UDP via an address (i.e., the discovery address) corresponding to an IP address and port number of a UDP broadcast. The discovery datagram may be comprised of a plurality of addresses including an address associated with the URL of the FTP/HTTP server 120, an address associated with the IP of the UDP broadcast of the flight navigation datagram, and the address associated with the IP of the TCP connection of the trackline data. Also, version information of the custom map configuration file 122 may be included in the discovery datagram.

The PED 160 could include any mobile device configured with a display and configured to perform the method of the application discussed in detail below. Examples of the PED 160 include, but are not limited to, the iPad, the iPhone, the MacBook, and the Apple Watch, each of which are produced by Apple, Inc. Also, the PED 160 may be configured with Wi-Fi technology to listen for datagrams generated by the flight navigation datagram generator 130 and the discovery datagram generator 150, and to exchange communications with the FTP/HTTP server 120 and the trackline generator 140.

The PED 160 (and the flight navigation datagram generator 130, the trackline data generator 140, and the discovery datagram generator 150) (collectively, "system electronic processors") could include any electronic data processing unit which executes software or computer instruction code that could be stored, permanently or temporarily, in a digital memory storage device or a non-transitory computer-readable media (generally, memory 162) including, but not limited to, random access memory (RAM), read-only memory (ROM), compact disc (CD), solid-state memory, secure digital cards, and compact flash cards. The PED 160 may be driven by the execution of software or computer instruction code containing algorithms developed for the specific functions embodied herein. The PED 160 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the PED 160 could also include more than one electronic data processing unit.

In some embodiments, the terms "programmed" and "configured" are synonymous. The PED 160 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the PED 160 via a physical or a virtual computer port. The PED 160 may be programmed or configured to execute the method discussed in detail below.

Some advantages and benefits exemplary of the inventive concepts disclosed herein are shown in FIGS. 2 through 4D illustrating how a presentation application such as, but not limited to, the "Rockwell Collins Airshow® for Apple Watch" application (Airshow app), may be configured to provide a viewer of the PED 160 a plurality of displays presenting flight information to the viewer of the PED 160. For the discussion of FIGS. 2 through 4D, it will be assumed that the flight is American Airlines Flight No. 34 from Los Angeles International Airport, Los Angeles, Calif. (LAX) to John F. Kennedy International Airport, New York, N.Y. (JFK).

Referring now to FIG. 2, a first display 200 presentable by the PED 160 (illustrated by a watch) and exemplary of the inventive concepts disclosed herein is illustrated. The first display 200 could include a time of day (TOD) 202 that is viewer selectable to, for example, display the time at the destination city, the departure city, or current location), a flight number 204, a logo 206, departure and destination airports 208, elapsed time since departure 210, estimated time enroute (ETE) 212, a rounded indicator comprised of a flight progress scale 214, a rounded indicator comprised of a flight progress bar 216, and a symbol of an aircraft 218.

The flight progress scale 214 could be indicative of the total distance between the departure and destination airports, and the flight progress bar 216 could be indicative of the distance from the departure airport. The circumference of the flight progress scale 214 represents the total distance, and the length of the arc of the flight progress bar 216 represents the distance from the departure airport proportional to the total distance. As the aircraft continues towards its destination, the arc will grow longer in a clockwise direction until its length equals the circumference upon reaching the destination.

In some embodiments, the PED 160 may be configured with built-in functionality of a magnetic compass which informs a viewer the direction in which the top of the PED 160 points, and this functionality may be employed to provide the viewer with the displays disclosed herein. In some embodiments, the aircraft symbol 218 could be a directional pointer pointing in the direction of the aircraft's ground track or path of the flight plan approved by as aviation governing authority (such as the Federal Aviation Administration in the United States). In some embodiments, the aircraft symbol 218 could point in the direction of the aircraft's heading. In some embodiments, the aircraft symbol 218 could be fixed to point to the top of the screen and independent of the direction in which the aircraft is flying. In some embodiments, the aircraft symbol 218 could point to magnetic north.

Figure 3A:
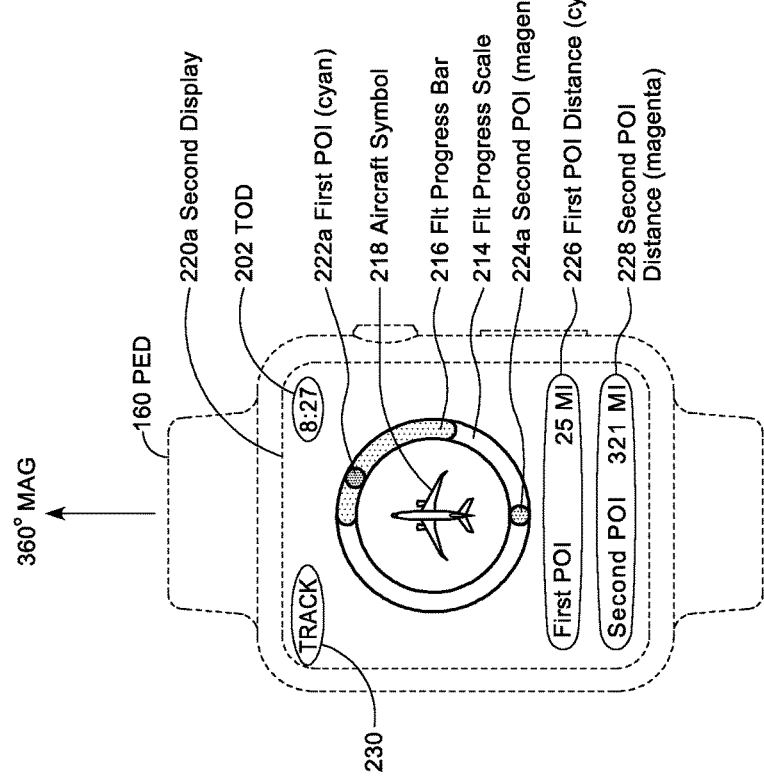
FIG. 3A depicts a second exemplary display provided by the distribution, generation, and presentation system according to some embodiments of the inventive concepts disclosed herein.

Referring now to FIG. 3A, a second display 220a comprised of the TOD 202, the flight progress scale 214, the flight progress bar 216, and the symbol of an aircraft 218 are illustrated. The second display 220a could also include a relative location (RL) symbol 222a of a first point of interest (POI) and a RL symbol 224a of a second POI. The POI could include any point that could be of interest to a viewer of the PED 160 such as, but not limited to, cities, landmarks, nearby aircraft, or aircraft that are part of a fleet of aircraft owned and/or operated by the same person or entity. As shown, a distance to the first POI 226 and a distance to the second POI 228 are included below the flight progress scale 214.

As observed, the RL symbols 222a and 224a are located within the flight progress scale 214, and as such, the distance between each and the center of the symbol aircraft 218 are not scaled proportionally to a distance from the aircraft. The RL symbols 222a and 224a, however, may be scaled to the angular direction or bearing from the direction of the aircraft symbol 218. The RL symbol 222a of the first POI is shown at an approximate one o'clock position or an approximate bearing of thirty degrees from the direction of the aircraft symbol 218; likewise, the RL symbol 224a of the second POI is shown at an approximate six o'clock position or an approximate bearing of one-hundred eighty degrees from the direction of the aircraft symbol 218.

As discussed above, the direction to which the symbol of the aircraft points could depend on a viewer's selection or preference. For the discussion of FIGS. 3A through 4D, assume that a magnetic course or the ground track of the aircraft is three-hundred sixty degrees (which is also magnetic north), the magnetic heading of the aircraft is thirty degrees (indicative of a wind correction angle of thirty degrees), the bearing of the first POI is thirty degrees to the right from the ground track, and the bearing to the second POI is one-hundred eighty degrees from the ground track.

Referring to the second display 220a, the viewer has selected a mode in which the aircraft symbol 218 will point in the direction of the aircraft ground track as indicated by TRACK 230, where the selection may be performed, for example, an advanced gesture of swiping. Given this selection, the RL symbol 222a of the first POI is shown at the one o'clock position, and the RL symbol 224a of the second POI bearing is shown at the six o'clock position when the top of the PED 160 is facing in the direction of three-hundred sixty degrees.

Referring now to FIG. 3B, a third display 220b is shown where the top of the PED 160 is facing in the direction of ninety degrees with TRACK 230 selected. As compared with the second display 220a, the aircraft symbol 218 has rotated to the nine o'clock position, the RL symbol 222b of the first POI has rotated to the ten o'clock position, and the RL symbol 224b of the second POI bearing has rotated to the three o'clock position while the flight progress scale 214 and flight progress bar 216 remain stationary.

Figure 3D:
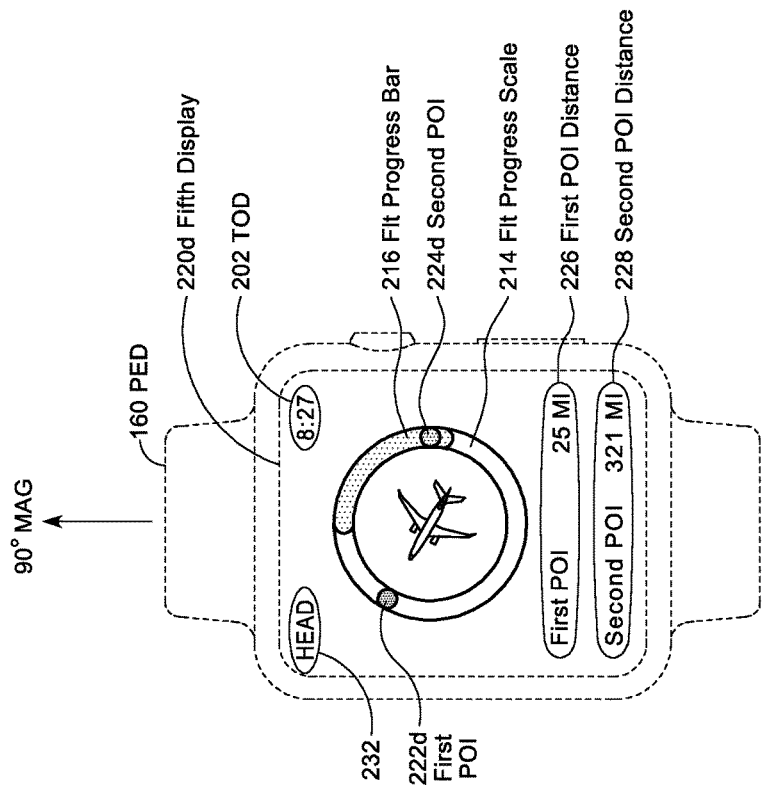
FIG. 3D depicts a fifth exemplary display provided by the distribution, generation, and presentation system according to some embodiments of the inventive concepts disclosed herein.
Figure 3C:
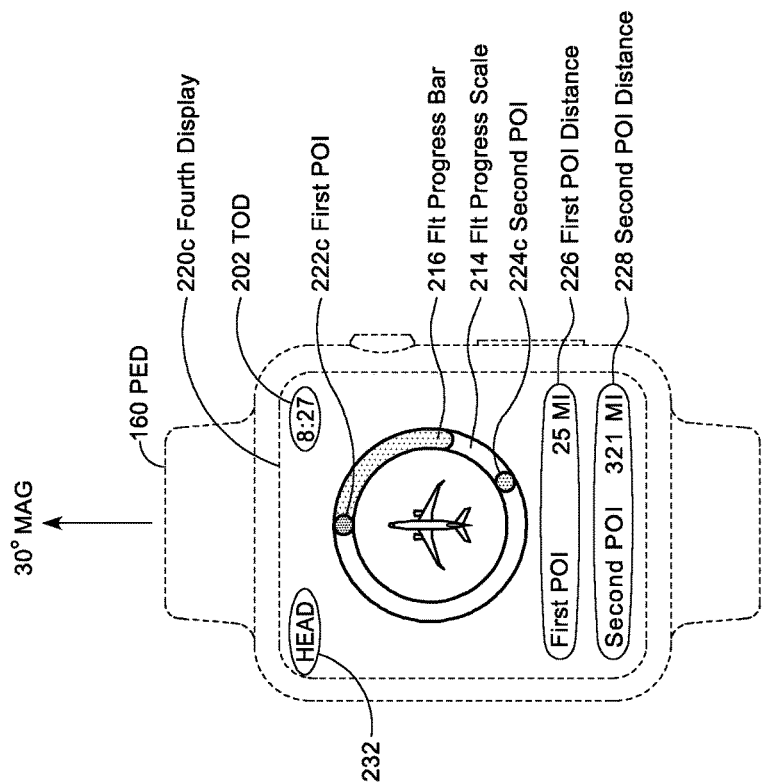
FIG. 3C depicts a fourth exemplary display provided by the distribution, generation, and presentation system according to some embodiments of the inventive concepts disclosed herein.
Figure 4B:
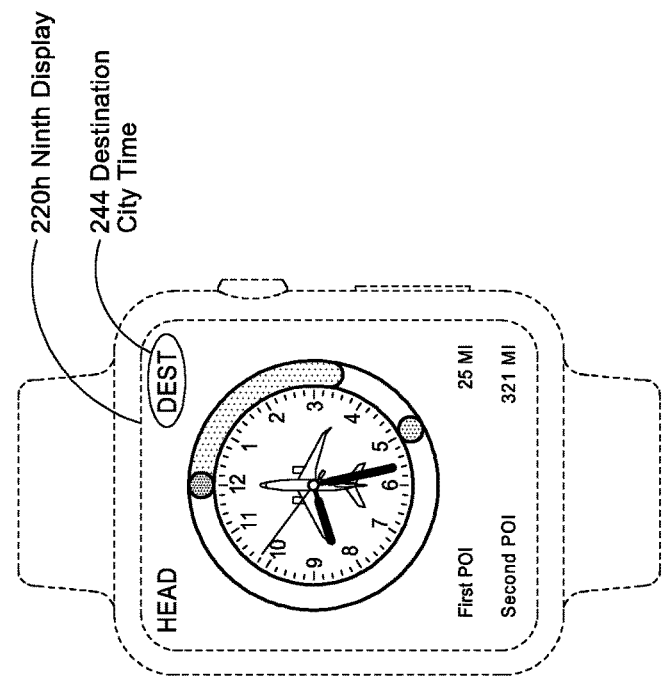
FIG. 4B depicts a ninth exemplary display provided by the distribution, generation, and presentation system according to some embodiments of the inventive concepts disclosed herein.
Figure 4A:
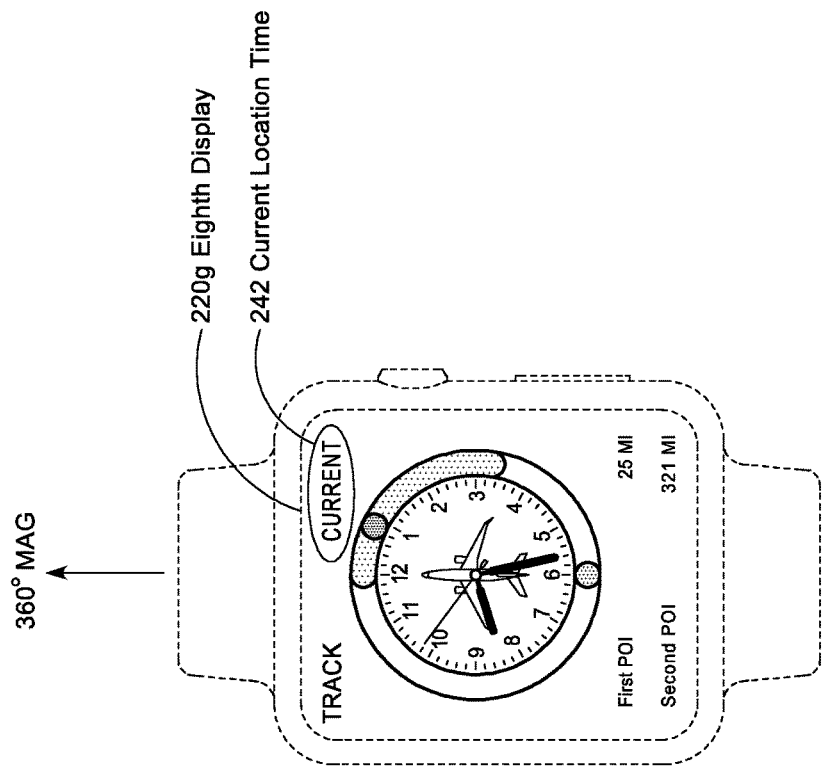
FIG. 4A depicts an eighth exemplary display provided by the distribution, generation, and presentation system according to some embodiments of the inventive concepts disclosed herein.
Figure 4D:
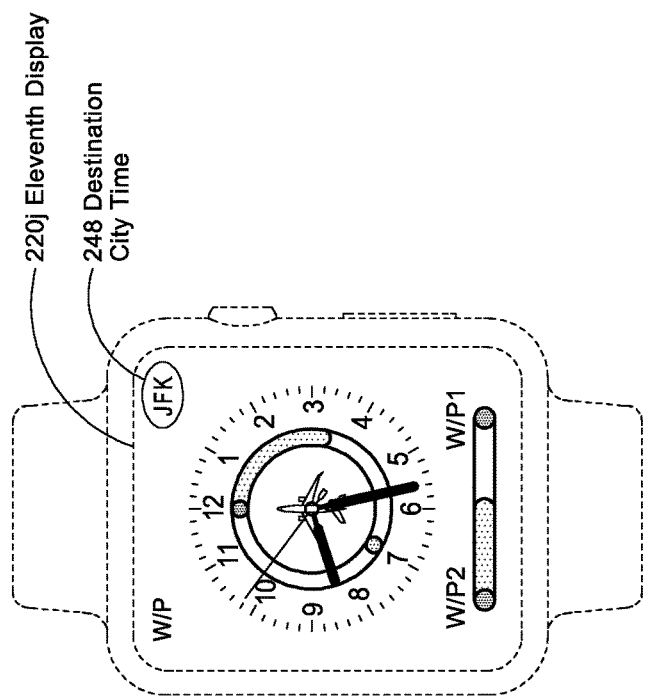
FIG. 4D depicts an eleventh exemplary display provided by the distribution, generation, and presentation system according to some embodiments of the inventive concepts disclosed herein.
Figure 4C:
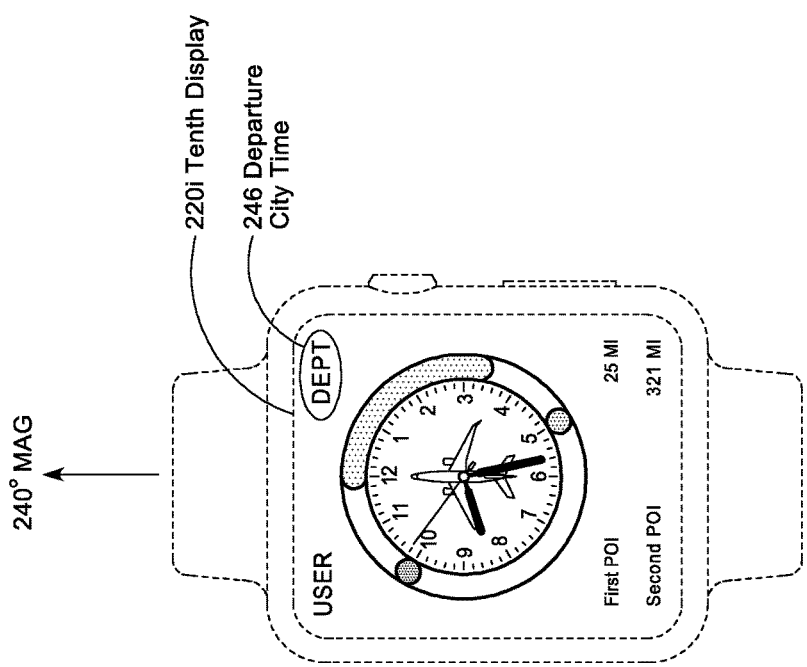
FIG. 4C depicts a tenth exemplary display provided by the distribution, generation, and presentation system according to some embodiments of the inventive concepts disclosed herein.

Referring now to FIG. 3C, a fourth display 220c is shown where the viewer has selected a mode in which the aircraft symbol 218 points in the direction of the aircraft heading as indicated by HEAD 232. Given this selection, the RL symbol 222c of the first POI is shown at the twelve o'clock position, and the RL symbol 224c of the second POI bearing is shown at the five o'clock position when the top of the PED 160 is facing in the direction of thirty degrees.

Referring now to FIG. 3D, a fifth display 220d is shown where the top of the PED 160 is facing in the direction of ninety degrees with HEAD 232 selected. As such, the aircraft symbol 218 has rotated to the ten o'clock position, the RL symbol 222d of the first POI has rotated to the ten o'clock position, and the RL symbol 224d of the second POI bearing has rotated to the three o'clock position while the flight progress scale 214 and flight progress bar 216 remain stationary.

Referring now to FIG. 3E, a sixth display 220e is shown where the viewer has selected a user mode in which the aircraft symbol 218 will not rotate but point to the top of the PED as indicated by USER 234. Given this selection, the RL symbol 222e of the first POI is shown at the five o'clock position, and the RL symbol 224e of the second POI bearing is shown at the ten o'clock position when the top of the PED 160 is facing in the direction of two-hundred forty degrees.

Additionally, when the top of the PED 160 is facing the direction of three-hundred sixty degrees, the second display 220a will be indicated with the exception of USER 234 being displayed instead of TRACK 230; similarly, when the top of the PED 160 is facing the direction of thirty degrees, the fourth display 220c of FIG. 3C will be indicated with the exception of USER 234 being displayed instead of HEAD 232.

Referring now to FIG. 3F, a seventh display 220f is shown where the viewer has selected a waypoint mode in which the aircraft symbol 218 will not rotate but point to the top of the PED as indicated by W/P 236. In addition, the top of the PED 160 will be assume to face the direction of the ground track regardless of the actual direction to which the PED 160 is facing. Given this selection, the RL symbols 222f and 224f could be indicative of the next waypoint W/P1 and preceding waypoint W/P2, respectively, defining the current flight leg of the aircraft. Because the bearings to the next waypoint W/P1 and preceding waypoint W/P2 are twelve o'clock and seven o'clock, respectively, as shown in the seventh image 220f, the viewer may glean that the aircraft passed W/P2, turned left, and is flying towards W/P1 while being located on the ground track of the current flight leg of the flight plan.

Included in the seventh display 220f are a flight leg progress scale 238 and a flight leg progress bar 240, where the former could be indicative of the distance of a current flight leg, and the latter could be indicative of the distance along the current flight leg from the previous waypoint W/P2. The length of the flight leg progress scale 238 represents the distance of a flight plan leg, and the length of the flight leg progress bar 240 represents the distance along the flight plan leg from the previous waypoint W/P2 proportional to the distance of the flight plan leg. As the aircraft continues towards the next waypoint W/P1, the distance progress bar 240 will grow longer to the right.

Referring now to FIGS. 4A through 4D, images of analog clock faces have been added to the second display 220a, the fourth display 220c, the sixth display 220e, and seventh display 220f of FIGS. 3A, 3C, 3E, and 3F, respectively. As observed, the TODs 202 of the second display 220a, fourth display 220c, sixth display 220e, and seventh display 220f have been replaced with information providing the viewer of a current time being displayed by the hands of the clock. In an eighth display 220g of FIG. 4A, CURRENT informs the viewer of current time at the current location 242 of the aircraft. In a ninth display 220h of FIG. 4B, DEST informs the viewer of the current time at the destination city 244. In a tenth display 220i, DEPT informs the viewer of the current time at the departure city 246. In an eleventh display 220j, JFK informs the viewer of the current time at the destination city 248 (specially, the destination of John F. Kennedy International Airport). In some embodiments, the current time could be included in the flight navigation datagram. In some embodiments, the current time could be provided by the PED 160.

Figure 5:
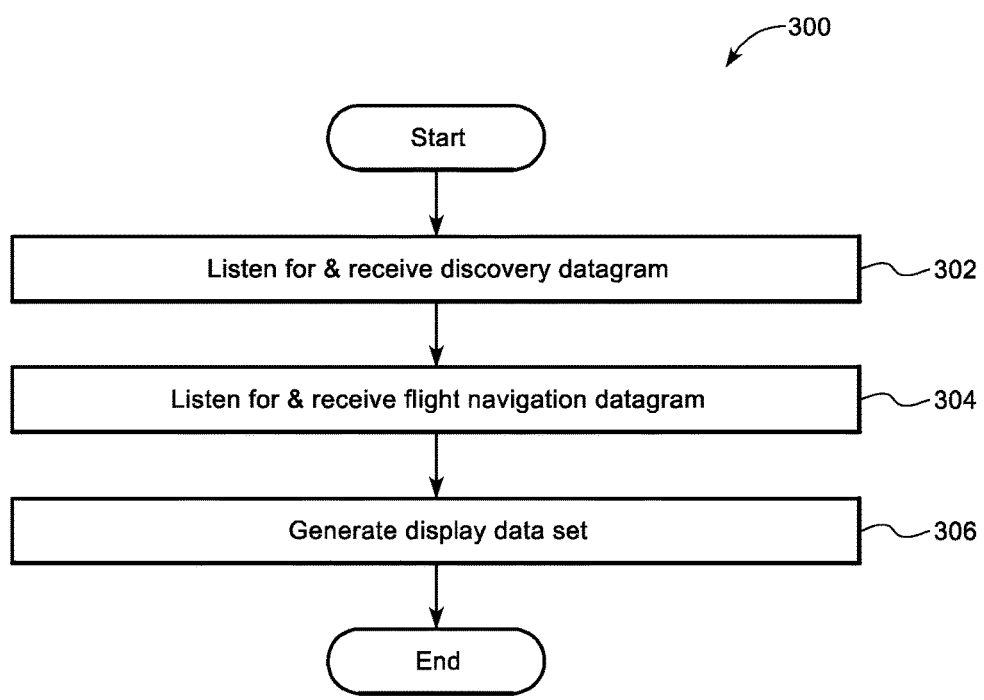
FIG. 5 illustrates a flowchart disclosing an embodiment of a method for presenting relative locations of points of interest that may be displayable or presentable to a viewer.

FIG. 5 depicts flowchart 300 providing an example method for presenting relative locations of points of interest that may be displayable or presentable for a viewer of the PED 160, where the PED 160 may be configured with an application (e.g., the Airshow app) programmed or configured with instructions corresponding to the following modules that that may be continuously or periodically executed throughout an operation of an aircraft. For the accomplishment of the following modules embodied in FIG. 5, the acquiring of data is synonymous and/or interchangeable with reading, receiving, and/or the retrieval of data.

The method of flowchart 300 begins with module 302 with the PED 160 listening for and receiving a discovery datagram upon the launch of the application, where such operations may be performed at the time when the application is launched via the discovery address associated with IP address and port number of the UDP broadcast of the discovery datagram.

The method of flowchart 300 continues with module 304 with the listening for and receiving of a flight navigation datagram representative of navigation data provided by a source of navigation data 132. These operations may be continuously performed via the flight navigation address associated with IP address and port number of the UDP broadcast of the flight navigation datagram.

The method of flowchart 300 continues with module 306 with the PED 160 generating a display data set as a function of the navigation data represented in the flight navigation datagram. The display data set could be representative of a plurality of screen images as discussed above and presentable to the viewer(s) on the screen of the PED 160. Then, the method of flowchart 300 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A device for generating a relative location indicator, comprising:
    an electronic device including at least one processor coupled to a non-transitory processor-readable medium storing processor-executable code and configured to:
        generate a display data set continuously based upon navigation data and representative of images, presentable to a viewer, of at least
        a directional pointer;
        a first rounded indicator of a fixed length scaled to a first distance;
        a second rounded indicator of a variable length coinciding on at least a part of the first rounded indicator and indicative of a second distance; and
        at least one location symbol coinciding on a part of the first rounded indicator, such that
            a position of each one of the at least one location symbol is dependent upon an angular bearing measured with reference to the directional pointer.

2. The device of claim 1, wherein the directional pointer is rotatable about a center point.

3. The device of claim 1, wherein
    the first distance is a distance between a departure airport and a destination airport, and
    the second distance is a distance between an aircraft in flight and the departure airport.

4. The device of claim 1, wherein the directional pointer points in a direction of an aircraft's ground track or an aircraft's heading.

5. The device of claim 1, wherein
    each one of the at least one location symbol represents a location of a point of interest outside of an aircraft, and
    the position of each one of the location symbol is not dependent upon a distance to the represented location of the point of interest.

6. The device of claim 1, wherein the display data set is further representative of an image of a clock face coinciding with the directional pointer.

7. The device of claim 1, wherein the navigation data is representative of flight navigation information received from an aircraft navigation system.

8. The device of claim 1, wherein
    the electronic device is a portable electronic device (PED), and
    the images are presentable on the PED.

9. An avionics system for distributing in-flight information to a portable electronic device (PED), comprising:
    a discovery datagram generator configured to
        generate a discovery datagram comprised of
            a first address of an internet protocol (IP) address and port number of a user datagram protocol (UDP) broadcast of a flight navigation datagram, and
        broadcast the discovery datagram to a PED via a second address of an IP address and port number of a discovery datagram UDP broadcast; and
    a flight navigation datagram generator configured to
        receive navigation data representative of flight navigation information from an aircraft navigation system, and
        generate and broadcast to the PED via the first address a flight navigation datagram comprised of the navigation data, where
            the PED includes at least one processor coupled to a non-transitory processor-readable medium storing processor-executable code and configured to:
                listen for and receive the discovery datagram via the second address upon the launch of an application,
                listen for and receive the flight navigation datagram continuously via the first address after the discovery datagram is received, and
                generate a display data set continuously based upon the navigation data received in the flight navigation datagram, where
                    the display data set is representative of images of at least
                    a directional pointer,
                    a first rounded indicator of a fixed length scaled to a first distance,
                    a second rounded indicator of a variable length coinciding on at least a part of the first rounded indicator and indicative of a second distance, and
                    at least one location symbol coinciding on a part of the first rounded indicator, such that
                        a position of each one of the at least one location symbol is dependent upon an angular bearing measured with reference to the directional pointer.

10. The avionics system of claim 9, wherein the directional pointer is rotatable about a center point.

11. The avionics system of claim 9, wherein
    the first distance is a distance between a departure airport and a destination airport, and
    the second distance is a distance between an aircraft in flight and the departure airport.

12. The avionics system of claim 9, wherein the directional pointer points in a direction of an aircraft's ground track or an aircraft's heading.

13. The avionics system of claim 9, the display data set is further representative of an image of a clock face coinciding with the directional pointer.

14. The avionics system of claim 9, wherein the PED is further configured to present the images represented in the display data set to a viewer of the PED.

15. A method for presenting in-flight information on a portable electronic device (PED), comprising:
- listening for and receiving, by at least one processor executing processor-executable code in a PED, a discovery datagram via a first address upon the launch of an application;
- listening for and receiving a flight navigation datagram continuously via a second address after the discovery datagram is received, where
  - the flight navigation datagram is comprised of navigation data representative of flight navigation information; and
- generating a display data set continuously based upon the navigation data received in the flight navigation datagram, where
  - the display data set is representative of images of at least
    - a directional pointer,
    - a first rounded indicator of a fixed length scaled to a first distance,
    - a second rounded indicator of a variable length coinciding on at least a part of the first rounded indicator and indicative of a second distance, and
    - at least one location symbol coinciding on a part of the first rounded indicator, such that
      - a position of each one of the at least one location symbol is dependent upon an angular bearing measured with reference to the directional pointer.

16. The method of claim 15, wherein the directional pointer is rotatable about a center point.

17. The method of claim 15, wherein
- the first distance is a distance between a departure airport and a destination airport, and
- the second distance is a distance between an aircraft in flight and the departure airport.

18. The method of claim 15, wherein the directional pointer points in a direction of an aircraft's ground track or an aircraft's heading.

19. The method of claim 15, wherein the display data set is further representative of an image of a clock face coinciding with the directional pointer.

20. The method of claim 15, further comprising:
- presenting the images represented in the display data set to a viewer of the PED.

* * * * *